W. S. JAMES.
METHOD OF MANUFACTURING GLASS ARTICLES.
APPLICATION FILED FEB. 21, 1913.
1,175,150.
Patented Mar. 14, 1916.
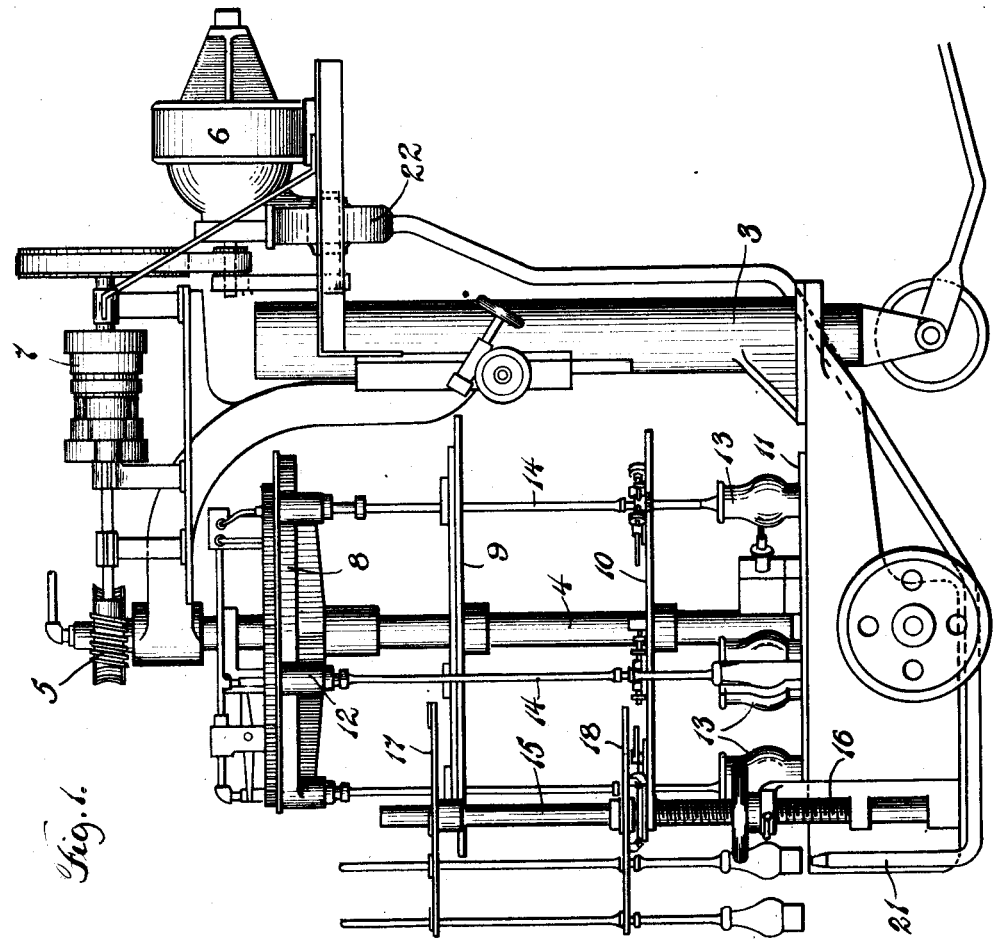
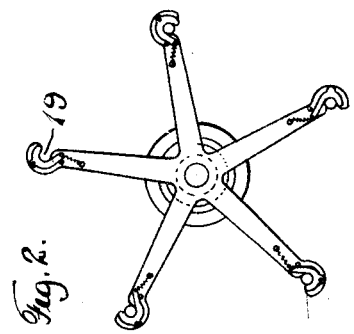
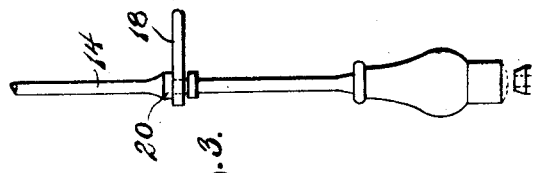
WITNESSES:
INVENTOR.
Wm. S. James
BY
ATTORNEYS.

UNITED STATES PATENT OFFICE.

WILLIAM S. JAMES, OF CHARLEROI, PENNSYLVANIA, ASSIGNOR TO MACBETH-EVANS GLASS COMPANY, OF PITTSBURGH, PENNSYLVANIA, A CORPORATION OF PENNSYLVANIA.

METHOD OF MANUFACTURING GLASS ARTICLES.

1,175,150.   Specification of Letters Patent.   Patented Mar. 14, 1916.

Application filed February 21, 1913. Serial No. 749,823.

*To all whom it may concern:*

Be it known that I, WILLIAM S. JAMES, a citizen of the United States, residing at Charleroi, in the county of Washington and State of Pennsylvania, have invented certain new and useful Improvements in Methods of Manufacturing Glass Articles, of which the following is a specification.

This invention has reference to a method of manufacturing glass articles and relates particularly to the handling of said articles after the completion of the formative operation and while the glass is still in a somewhat plastic condition. It has for its primary objects the provision of an improved method of handling glass articles whereby the article is maintained in proper shape until the glass has become hardened or set; and the provision of an improved method of handling glass articles wherein the glass is supported on a column of air subsequent to the formative operations and maintained in proper shape until the glass is set. These, together with such other objects as may hereinafter appear, I attain by provision of an apparatus, one embodiment of which I have illustrated in the accompanying drawings wherein—

Figure 1 is a side elevation of a rotary glass blowing machine of the Owens type showing the application of my improved apparatus thereto, and Figures 2 and 3 are views of details of the apparatus.

In the manufacture of glass articles, it is frequently difficult to maintain the formed article in proper shape immediately subsequent to the completion of the article and while the glass is in a plastic or viscous condition in which it may readily lengthen or become otherwise distorted, this distortion being particularly noticeable where the article is formed on a glass making machine. My invention contemplates the provision of an improved method of handling the article whereby such or similar distortions are obviated. The method employed will be better understood by a description of its application to a specific form of apparatus utilized in the manufacture of glass articles, and attention is now directed to Figure 1.

I have there illustrated the general arrangement of a rotary glass blowing machine of the well known Owens type. Briefly described, this machine comprises a framework 3 in which is mounted a vertical shaft 4 which is rotated by a worm-gear 5 driven from the motor 6 by any preferred form of driving connection. 7. Mounted on the shaft are four frames, 8, 9, 10 and 11, said frames being adapted to rotate with the shaft. The frame 8 is provided with a plurality of blow-pipe receiving caps, 12, which have the usual rotary and reciprocable movement. The frame 11 carries the customary split molds, 13, in which the glass articles are molded and which are automatically opened and closed at stated intervals during the rotation of the machine in order to permit the insertion and removal of the blow pipes 14. The frames 9 and 10 are adapted to support the blow-pipes in suitable relation to the caps 12 and molds 13. The blow pipes are adapted to project slightly into the molds 13 and are readily placed in and removed from the machine. As thus far described, the operation is as follows. A blow-pipe is inserted into the furnace and a quantity of glass is gathered on the end thereof and worked into proper shape, after which the blow pipe is inserted into the machine. The mold is then closed and air pressure is supplied through the blow-pipe from the usual connections and the glass is blown into an article conforming to the shape of the mold. When the article is molded, the mold automatically opens and the blow-pipe together with the article can be removed from the glass blowing machine. This is accomplished in the present illustration by means of a take-out mechanism which will now be described.

The take-out mechanism comprises a shaft 15 rotatably mounted in the stem 16 which is adjustably mounted on the frame 9 of the machine. The shaft carries two spider frames 17 and 18, each of which is provided with a plurality of arms having their outer ends hooked, as at 19, said hooked ends lying in the path of travel of the blow pipes in the glass machine and being adapted to engage said blow-pipes and remove them from the machine. The two spider frames are substantially similar in construction and a plan view of the upper one is shown in Fig. 2. From inspection of Fig. 3 it will be seen that the blow-pipes are supported by means of the collars 20. The take-out mechanism is given a step by step rotary movement by its engagement with the blow-pipes supported on the rotating glass machine. It will thus be seen that as each blow-pipe is successively engaged, the immediately preceding one is advanced a short distance to one side. Immediately beneath this point is located a pipe 21 which leads from a fan 22 operated by the motor 6, the nozzle of the pipe being so disposed as to direct a jet or column of air against the bottom of the molded article adhering to the blow-pipe.

In the drawings I have shown molds which will form a hollow glass article having a bottom. It has been found by experience that the bottom portions of glass articles frequently lengthen or sag for the reason that such portions frequently remain in a hot plastic or viscous condition longer than the other portions, and this has been particularly found in the manufacture of hollow glass articles such as shown in the drawings, and in which the bottom sags somewhat in the manner indicated in dotted lines in Fig. 3. By supporting the article immediately subsequent to the formation operation over a column of air, the bottom of the article is held up or supported until the glass sets. The column of air therefore serves a double function; viz. it supports the glass, and chills or cools it. It will be of course apparent, especially where the article is thin, that the chilling is almost instantaneous. By the time the succeeding blow-pipe has been engaged and removed, the glass has set and the blow-pipe can be removed and the article struck off in the usual manner.

The foregoing illustrates one form of the invention, and in this application it will be readily apparent that a superior article and simplicity of handling is attained. The rapidity of production is also increased, and the cost thereof correspondingly decreased.

Broadly stated, therefore, it will be clear that my invention contemplates; first, the supporting of a glass article over a column or jet of air for an interval in order to maintain its shape until the glass has set; and second, the chilling of the glass by a blast of air subsequent to the formative operation.

Having thus described my invention and illustrated its use, what I claim as new and desire to secure by Letters Patent is the following:

1. The herein described process of making glass articles which consists in forming the article and then in supporting the article while in a viscous condition above a fluid column or jet to prevent the article from sagging.

2. The herein described process of making glass articles which consists in forming the article, in separating the article while still hot from the forming means and in maintaining the configuration of the article by a fluid blast directed on the exterior of the article.

3. The herein described process of making glass articles which consists in forming the article, in removing the article while still hot from the forming means and then in chilling the article by a fluid blast.

4. The herein described process of making glass articles which consists in forming the article, in removing the article from the forming means, and then in supporting and chilling the bottom of the article by a fluid blast.

In testimony whereof I have hereunto signed my name in the presence of the two subscribed witnesses.

WILLIAM S. JAMES.

Witnesses:
C. R. PEREGRINE,
HERMAN A. HEUPEL.